US012812060B2

(12) United States Patent
Mannuru et al.

(10) Patent No.: US 12,812,060 B2
(45) Date of Patent: Nov. 24, 2026

(54) SYSTEMS AND METHODS FOR DOCUMENT BACKGROUND COLOR SUPPRESSION

(71) Applicant: XEROX CORPORATION, Norwalk, CT (US)

(72) Inventors: Ravindranath Mannuru, Guntur (IN); Haripriya Chandran, Kulathur (IN); Rajasekar Kanagasabai, Chennai (IN); Sainarayanan Gopalakrishnan, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 170 days.

(21) Appl. No.: 18/976,103

(22) Filed: Dec. 10, 2024

(65) Prior Publication Data

US 2026/0163992 A1 Jun. 11, 2026

(51) Int. Cl.
*H04N 1/60* (2006.01)
*H04N 1/62* (2006.01)

(52) U.S. Cl.
CPC ......... *H04N 1/6008* (2013.01); *H04N 1/6072* (2013.01); *H04N 1/62* (2013.01)

(58) Field of Classification Search
CPC ....... H04N 1/6008; H04N 1/6072; H04N 1/62
USPC ........................................................... 358/1.9
See application file for complete search history.

(56) References Cited

U.S. PATENT DOCUMENTS

| | | | | |
|---|---|---|---|---|
| 10,986,250 | B1 * | 4/2021 | Metcalfe | H04N 1/6005 |
| 12,026,893 | B1 * | 7/2024 | Leathers | H04N 1/6008 |
| 2013/0003091 | A1 * | 1/2013 | Matsuzaki | G09G 3/20 345/590 |
| 2015/0325178 | A1 * | 11/2015 | Nagashima | G06K 15/1878 |
| 2017/0255849 | A1 * | 9/2017 | Li et al. | B01D 61/025 |

* cited by examiner

*Primary Examiner* — Gabriel I Garcia
(74) *Attorney, Agent, or Firm* — MH2 Technology Law Group LLP

(57) ABSTRACT

Methods and systems for background color suppression. The method includes receiving image data of an input image in a color space. The input image pertains to a document having a background color and the image data includes lightness values of pixels in the input image. Elevation angles are computed for the pixels in the input image and accumulated. A tile region is selected in the input image, where the tile region includes a portion in the input image. The tile region is processed to determine a first threshold value (FTV) and a second threshold value (STV). The elevation angles for pixels in the input image are compared with the FTV and the lightness values of pixels in the input image are compared with the STV. Based on the comparison, background color suppression is performed.

20 Claims, 11 Drawing Sheets
(2 of 11 Drawing Sheet(s) Filed in Color)

SYSTEMS AND METHODS FOR DOCUMENT BACKGROUND COLOR SUPPRESSION

TECHNICAL FIELD

The present disclosure generally relates to image processing, and more particularly, to document background color suppression.

BACKGROUND

Background color suppression is a feature found in copiers and multi-functional systems to remove or harmonize a color of the background in an electronic or digital image. The "background" may refer to a color of a print medium such as paper or other object that may be scanned to produce the electronic image. The suppression or removal of color in the background makes the electronic image (and the background) appear more uniform and consistent, thereby improving the image quality.

One approach to background color suppression involves applying a linear transformation (adjusting gain and offset) to the color-dependent luminance channel of the electronic image, such as in red/green/blue (RGB) and luma/blue-difference chroma/red-difference chroma (YCbCr) color spaces, followed by chrominance adjustments for background pixels. However, the resulting image tends to suffer from a substandard quality due to an undesirable change in the appearance of all colors including that of content in the image foreground.

In another approach to background color suppression, the input electronic image is converted to a color space with a broader or more extensive spectrum, such as the L*a*b* color space (or CIELAB color space). The resulting L*a*b* image (or LAB image) in the CIELAB color space has the L* dimension representing lightness while the a* and b* denote color-opponent dimensions. The LAB image has L*, a*, and b* values along the L*, a*, and b* axes, respectively. The L*, a*, and b* values are subjected to 3D-to-1D trilinear interpolation to generate an interpolated value along a linear axis, representing the background in the input electronic image. The interpolated value, for pixels in the background, is averaged to produce an averaged background. The LAB image is segmented based on both the averaged background and the incoming three L*, a*, and b* values. A multiplication factor is then applied to the segmented LAB image, based on the averaged background and the luminance strength of the pixels, to generate L*, a*, and b* outputs corresponding to a background-suppressed LAB image. This process is resource intensive, struggles to adjust or retain near-neutral shades, particularly in gradient regions, and fails to effectively suppress the background in colored media.

What is needed is for a background color suppression system that addresses neutral shades and colored media.

SUMMARY

The system in accordance with embodiments of the present disclosure includes a computer-implemented method for background color suppression in a document. The computer-implemented method includes, but is not limited to including, receiving, using a processor, image data of an input image associated with a color space. The input image pertains to a document having a background color, where the image data includes lightness values of pixels in the input image. The method also includes accumulating, using the processor, elevation angles computed for the pixels in the input image, where the elevation angles represent both hue and chroma of the corresponding pixel color. The method includes selecting, using the processor, a tile region in the input image, where the tile region corresponds to a background region in the input image. The tile region includes at least one of a corner and an edge portion in the input image. The method further includes comparing, using the processor, the elevation angles with a first threshold value and the lightness values with a second threshold value, where the first threshold value and the second threshold value may be determined based on the selected tile region. The method includes changing, using the processor, a pixel value of a pixel in the image data for background color suppression based on the comparison. The pixel may have an elevation angle and a lightness value, where the pixel value may be changed to a value of white color in the color space when the elevation angle is greater than the first threshold value and the lightness value is greater than the second threshold value.

In some configurations, the system includes a memory unit and a processor in communication therewith. The memory unit stores image data of an input image in a color space, where the input image is associated with a document having a background color. The processor may be configured to receive the image data including lightness values of pixels in the input image and accumulate elevation angles computed for the pixels in the input image, where the elevation angles represent both hue and chroma of the corresponding pixel color. The processor may be further configured to select a tile region in the input image, where the tile region may correspond to a background region in the input image. The tile region includes at least one of a corner and an edge portion in the input image. The processor may be also configured to compare the elevation angles with a first threshold value and the lightness values with a second threshold value, where the first threshold value and the second threshold value may be determined based on the selected tile region, and change a pixel value of a pixel in the image data for background color suppression based on the comparison. The pixel may have a predetermined elevation angle and a predetermined lightness value, where the pixel value may be changed to a value of white color in the predetermined color space when the elevation angle is greater than the first threshold value and the lightness value is greater than the second threshold value.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for background color suppression in a document. The method includes receiving, using a processor, image data of an input image in a color space, the input image pertaining to the document having a background color, where the image data includes lightness values of pixels in the input image. The method also includes accumulating, using the processor, elevation angles computed for the pixels in the input image, where each of the elevation angles represents hue and chroma of a color of the pixel. The method also includes selecting, using the processor, a tile region in the input image, the tile region having a first threshold value for the elevation angles and a second threshold value for the lightness values. The method also includes suppressing the background color in the input image by changing a pixel value of the pixel to a pre-selected color when the elevation angle of the pixel is greater than the first threshold value and the lightness value of the pixel is greater than the second threshold value. Other embodiments of this aspect include corresponding computer systems, apparatus, and computer programs recorded on one or more computer storage devices, each configured to perform the actions of the methods.

Implementations may include one or more of the following features. The method where the color space may include a L*a*b* color space, where the elevation angle corresponds to an angle between a lightness axis and a color vector originating from a focal point on the lightness axis to a pixel color in the L*a*b* color space. The focal point may include a midpoint of the lightness axis in the L*a*b* color space. The method may include selecting the tile region based on a kernel having a configurable number of rows and columns of cells. The method may include transposing the kernel when changing an orientation of the input image. The first threshold value may include the elevation angle corresponding to a lowest local peak closest to a maximum peak in the first histogram. The second threshold value may include the lightness value corresponding to a lowest local peak closest to a maximum peak in the second histogram. The method may include determining the lightness values for the pixels in the selected tile region from the image data. The method may include receiving the input image from an image source including at least one of a camera, an optical scanner, or a computing device. The method may include updating the to include the changed pixel value, wherein the updated image data includes an updated image, converting, using the processor, the updated image into a second color space to generate an output image, and performing, using the processor, a task using the output image, where the task includes at least one of (i) printing the output image on a print medium, (ii) displaying the output image on a display device, (iii) sending the output image to a remote device, or (iv) storing the output image in a memory device. Implementations of the described techniques may include hardware, a method or process, or computer software on a computer-accessible medium.

One general aspect includes a system that includes a memory unit storing image data of an input image in a color space, where the input image pertains to a document having a background color. The system also includes a processor in communication with the memory unit, where the processor is configured to execute instructions that perform operations including receiving the image data including lightness values of pixels in the input image, accumulating elevation angles computed for the pixels in the input image, where each of the elevation angles represents hue and chroma of a color of the pixel, selecting a tile region in the input image, the tile region having a first threshold value for the elevation angles and a second threshold value for the lightness values, and suppressing the background color in the input image by changing a pixel value of the pixel to a pre-selected color when the elevation angle of the pixel is greater than the first threshold value and the lightness value of the pixel is greater than the second threshold value. Other embodiments of this aspect include corresponding computer systems, apparatus, and computer programs recorded on one or more computer storage devices, each configured to perform the actions of the methods.

Implementations may include one or more of the following features. The system where the color space may include a L*a*b* color space, where the elevation angle corresponds to an angle between a lightness axis and a color vector originating from a focal point on the lightness axis to a pixel color in the L*a*b* color space. The focal point may include a midpoint of the lightness axis in the L*a*b* color space. The operations further may include selecting the tile region based on a kernel having a configurable number of rows and columns of cells. The operations further may include transposing the kernel when changing an orientation of the input image. The operations further may include determining the first threshold value based on a first histogram created using the elevation angles computed for the pixels in the selected tile region, where the first threshold value is the elevation angle corresponding to a lowest local peak closest to a maximum peak in the first histogram. The operations further may include determining the second threshold value based on a second histogram created using the lightness values determined for the pixels in the selected tile region, where the second threshold value is the lightness value corresponding to a lowest local peak closest to a maximum peak in the second histogram. The operations further may include determining the lightness values for the pixels in the selected tile region from the image data. The operations further may include receiving the input image from an image source including at least one of a sensor or a computing device. The operations further may include updating, using the processor, the image data to include the changed pixel value, where the updated image data includes an updated image, converting, using the processor, the updated image into a second color space to generate an output image, and performing, using the processor, a task using the output image, where the task includes at least one of (i) printing the output image on a print medium, (ii) displaying the output image on a display device, (iii) sending the output image to a remote device, or (iv) storing the output image in a memory device. Implementations of the described techniques may include hardware, a method or process, or computer software on a computer-accessible medium.

Other and further aspects and features of the present disclosure will be evident from the detailed description, which is intended to illustrate, not limit, the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The illustrated embodiments of the subject matter will be best understood by reference to the drawings, wherein like parts are designated by like numerals throughout. The following description is intended as an example, and illustrates embodiments of devices, systems, and processes in accordance with the subject matter as claimed herein.

DETAILED DESCRIPTION

Figure 1A:
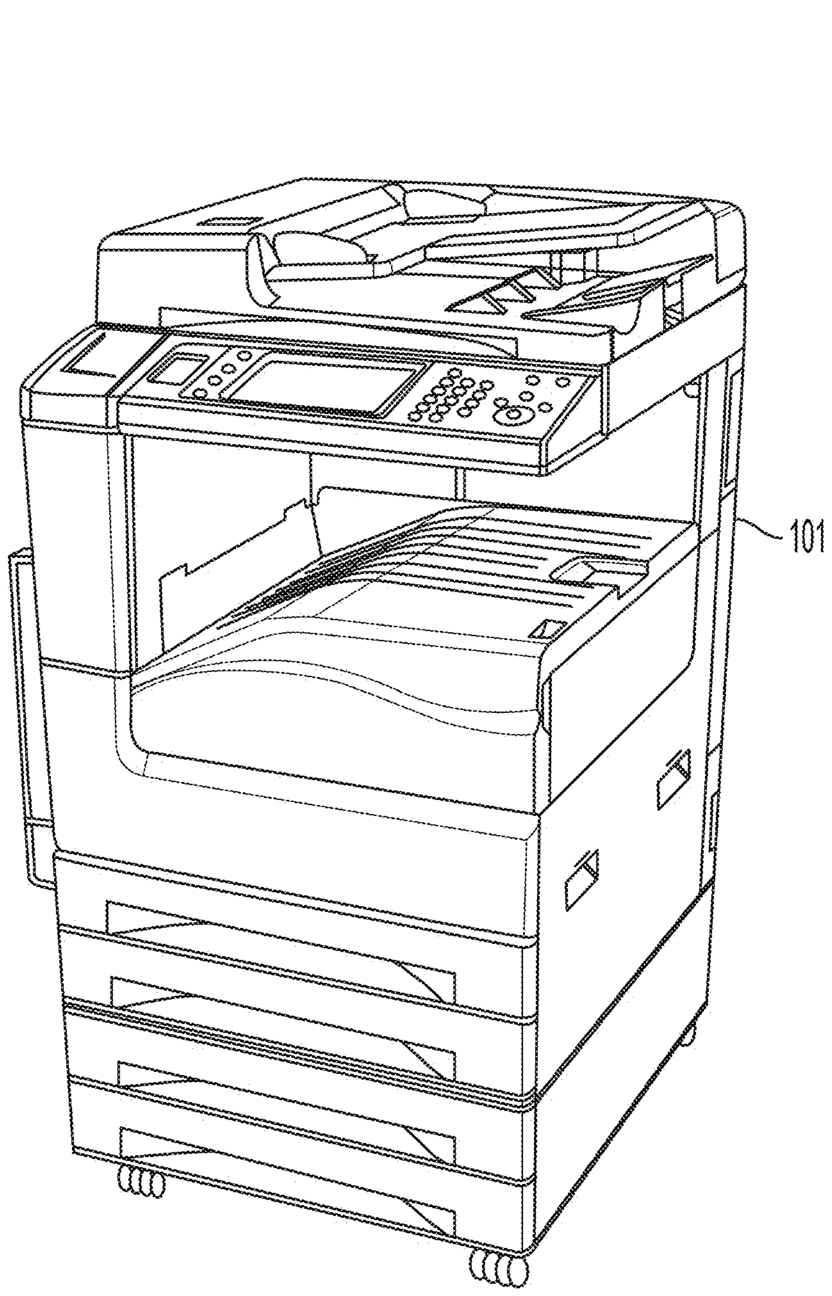
FIG. 1A illustrates multi-function device in which various embodiments of the present disclosure can be practiced.

The following detailed description is provided with reference to the drawings described herein. The components and steps in present disclosure may be used together and in different combinations. Details are set forth in order to provide an understanding of the present disclosure. It will be readily apparent that the present disclosure may be practiced without limitation of these details. Throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "substantially" means +/−1%, +/−2%, +/−5%, +/−10%, +/−15%, +/−20%, deviation from an expected value or a target value of an associated parameter.

Definitions of one or more terms that are used in the present disclosure are described below without limitations. For a person skilled in the art, it is understood that the definitions are provided for the sake of clarity, and are intended to include more examples than just provided below.

A "multi-function device" and "multi-functional device" are used interchangeably in the present disclosure in the context of their broadest definition. The multi-function device may refer to a computing device that incorporates one or more functions including printing, scanning, copying, emailing, archiving, and/or faxing in a single device. Further, the term also includes stand-alone scanning devices, such as scanners which can scan the document. The multi-function device may perform and/or facilitate these functions as a service to network devices operably connected thereto. The multi-function device may operate as a standalone device or as a peripheral device to network devices.

A "media," "medium," "print media," and "print medium" are used interchangeably in the present disclosure in the context of their broadest definition. The medium may refer to a physical substrate on which an image can be printed. Examples of the medium may include paper, plastic or polymer, cardboard, and metals.

A "document" is used in the present disclosure in the context of its broadest definition. The document may refer to an electronic document including a single page or multiple pages, unless specified otherwise. The document may represent or include a computer-readable file.

A "user" is used in the present disclosure in the context of its broadest definition. The user may refer to a human, an artificial intelligence unit, or a combination thereof. The user may be capable of providing, receiving, or processing an input (e.g., data or command, media, electronic images, etc.) to perform or facilitate one or more tasks including those discussed herein.

An "image," "electronic image," and "digital image" are used interchangeably in the present disclosure in the context of their broadest definition. The image may refer to a visual representation of electronic data such as raster objects, graphics objects, text, voice, and metadata (e.g., digital signatures, computer instructions, file path, user information, etc.) or any suitable combinations thereof. In some examples, the image may embed another image.

A "workflow" is used in the present disclosure in the context of its broadest definition. The workflow may refer to a set of one or more tasks performed by a computing device independently or in communication with the user.

An "image source" is used in the present disclosure in the context of its broadest definition. The image source may refer to a hardware or software entity configurable to read or capture the digital image and related data. The image source may include an optical scanner, camera, or other suitable image capture terminal. In some instances, the image source may represent or include a computing device and/or a sensor device.

A "sensor device" is used in the present disclosure in the context of its broadest definition. The sensor device may refer to an independent sensor, a sensor array, a computing device including a sensor, a sensor device array, or any suitable combinations thereof.

A "hue" is used in the present disclosure in the context of its broadest definition. The hue may refer to an attribute of a color that distinguishes it from other colors based on its dominant wavelength. Hue is independent of intensity and lightness, and assists to describe a 'type' of a color such as red, green, blue, etc.

A "chroma" is used in the present disclosure in the context of its broadest definition. The chroma (also sometimes referred to as saturation or intensity) may refer to the purity or vividness of a color. Chroma describes how much a color differs from a neutral gray of the same brightness.

A "printer," "print device," and "image forming device" are used interchangeably in the present disclosure in the context of its broadest definition. The printer as used herein encompasses any apparatus configurable to render an image on the print medium. The printer may include the multifunction device, digital copier, bookmaking machine, and facsimile machine.

A "kernel" is used in the present disclosure in the context of its broadest definition. The kernel may refer to a matrix of cells that assists defining or selecting a region of interest in an electronic image.

The numerous references in the present disclosure to a background color suppression (BCS) module are intended to cover any and/or all devices capable of performing respective operations on electronic images in a standalone device or a networked device environment relevant to the applicable context, regardless of whether or not the same are specifically provided.

In a system in accordance with embodiments of the present disclosure, the input image is transformed into a LAB image represented by L, a, b values in the CIELAB color space. The L, a, b values, after color space transformation, are mapped to elevation angles. A tile region may be taken from pre-selected areas of the input image, for example, but not limited to, one or more corners of the input image, areas that can contribute to a background region.

Histograms are generated for the elevation angles and lightness (L) values from the pre-selected areas. In the histograms, the local peaks before maximum peak values in the histograms are taken as thresholds for the respective elevation angle and lightness values in the LAB image. The elevation angles and lightness values of the pixels of the input image are compared with the respective threshold values, and pixel values in L*, a*, b* channels whose elevation angle and lightness value are greater than respective thresholds are set to white, which may be represented by (L=100, a=0, b=0) in the CIELAB color space. An elevation angle, which represents both hue and chroma of a pixel color in a single variable, improves results for neutral shade gradient regions and colored media and improves image quality. The system can be integrated with an existing software image path (SWIP) of a multi-function device.

FIG. 1A illustrates an environment 100A in which various embodiments of the present disclosure can be practiced. The environment 100A includes a multi-function device 101. The multi-function device 101 provides one or more functionalities such as printing, scanning, imaging, copying, and so on. The environment 100A may include, among other devices, an optical scanner. In the context of the present disclosure, the multi-function device 101 manages a background color(s) in scanned documents. For example, the multi-function device 101 may be configured to remove or harmonize a background color in a medium (e.g., a paper) scanned by the scanner.

In some configurations, a user may access the multi-function device 101 and submit an input medium including textual content and/or non-textual content for scanning. The multi-function device 101 initiates scanning of the input medium and generates a scanned document. The multi-function device 101 also transforms the scanned document to a LAB image represented by L, a, b values in the CIELAB color space and maps the L, a, b values to elevation angles. The multi-function device 101 selects a tile region proximate to a pre-selected area of the scanned document, and computes histograms for the elevation angles and lightness values for the pixels accumulated from the tile region. The multi-function device 101 analyzes the histogram to identify threshold values. In some configurations, the multi-function device 101 selects a local peak before a maximum peak in histograms created for the elevation angles and lightness (L) values from the selected tile region. The multi-function device sets the local peak corresponding to the elevation angles and the lightness values as thresholds. In the scanned document, the multi-function device 101 adjusts pixel values to a color (e.g., white) for pixels whose elevation angles and lightness values are greater than the corresponding thresholds for suppressing or harmonizing the background color. The multi-function device 101 generates a scanned output including an updated background (or background color). The scanned output may be provided in a suitable form, such as a printable document format (PDF). The multi-function device 101 harmonizes or suppresses the background color in the scanned output.

Figure 1B:
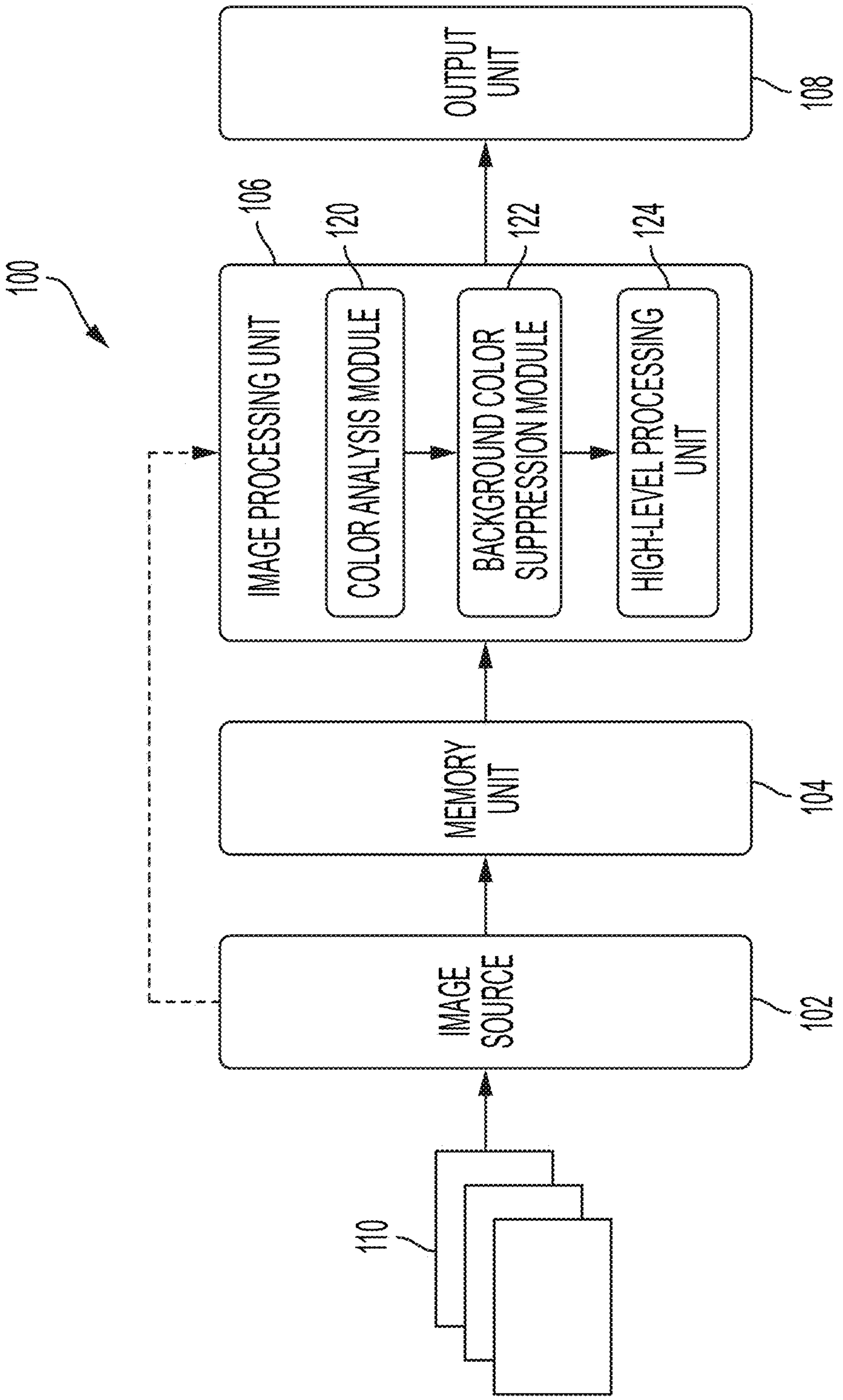
FIG. 1B is a schematic block diagram of a system implementing a background color suppression (BCS) module, according to an embodiment of the present disclosure.

FIG. 1B is a schematic block diagram of a system 100 for suppressing background color, in accordance with embodiments of the present disclosure. In the context of a media scanning workflow, a scanned image of a print medium, such as a physical document sheet, is manipulated to remove or unify a background color therein. The system may be implemented in image processing and/or image production environments including a computing device operating as a standalone device or in communication with network devices to suppress or harmonize the background color in an electronic image.

Continuing to refer to FIG. 1B, the system 100 includes an image source 102, a memory unit 104, an image processing unit 106, and an output unit 108. The image source 102 may be configured to provide or generate an electronic image in grayscale or a color space. For example, the image source 102 may scan a physical medium such as a paper 110 at a predetermined resolution, for example, 300 dots per inch (DPI), 600 DPI, and so on, to generate a scanned image in RGB color space. Other examples of the color space include Cyan/Magenta/Yellow/Key or Black) (CMYK), Hue, Saturation, Lightness (HSL), luminance/chrominance (YUV), and YCbCr. The image source 102 may refer to a hardware or software entity configurable to read or capture the electronic image and related data. The image source 102 may include, but are not limited to, an optical scanner, camera, or other image acquisition devices. In some configurations, the image source 102 may represent or include a computing device such as the multi-function device 101, a mobile phone, a server, a laptop, and an internet appliance. In some configurations, the image source 102 may include a sensor device.

Continuing to refer to FIG. 1B, the image source 102 may communicate the captured or scanned image to one or more connected devices over a network (not shown). The network may include the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or other delivery or tunneling mechanism for carrying data. The network may include multiple networks or sub-networks, which may include, for example, but not limited to, a wired or wireless data pathway. The network may include a circuit-switched voice network, a packet-switched data network, or other network able to carry electronic communications. For example, the network may include networks based on the Internet protocol (IP) or asynchronous transfer mode (ATM), and may support voice using, for example, Voice over Internet Protocol (VOIP), Voice-over-ATM, or other comparable protocols used for voice, video, and data communications. In some configurations, the image source 102 communicates the electronic image to the memory unit 104 over the network. In some configurations, the electronic image may be sent to the image processing unit 106 over the network. In some configurations, the image source 102 is configurable to receive an electronic image from a remote device.

Continuing to refer to FIG. 1B, the memory unit 104 may store the received electronic image for future access and/or retrieval by a network device such as the image processing unit 106. The memory unit 104 may include a computer-readable medium, a processor or multiple processors operatively connected together, volatile memory (e.g., RAM), non-volatile memory (e.g., flash memory), disk drive, etc., or combinations thereof. In some configurations, the memory unit 104 may receive the electronic image from a storage media (e.g., a compact disk, a flash drive, a memory card, etc.) via an interfaces. In some configurations, the memory unit 104 may store a kernel for use by the image processing unit 106 to suppress or harmonize the background color in the electronic image. In some configurations, the memory unit 104 may store image data such as values of image pixels (e.g., color values, intensity values, lightness values, etc.) in one or more variables independently or in association with the kernel. The memory unit 104 may operate in communication with the image processing unit 106 over the network.

Continuing to refer to FIG. 1B, the image processing unit 106 may represent a computing device including a processor operable to configure one or more modules to implement the methods and underlying concepts disclosed herein. In some configurations, the image processing unit 106 may be implemented as a network device. In some configurations, the image processing unit 106 may be implemented as a standalone and dedicated device including hardware and software, where the hardware is compatible with the requirements and/or functionality of the software. In some configurations, aspects of the image processing unit 106 may be implemented as a software application or a device driver. In some configurations, the image processing unit 106 may be configured to expose its computing environment or operating code to a user, and may include related art I/O devices, such as a keyboard or a display unit. In some configurations, the image processing unit 106 includes software, firmware, or other resources that support remote administration and/or maintenance of the image processing unit 106, or modules thereof. In some configurations, the image processing unit 106 either independently or in communication with other network devices may have video, voice, and data communication capabilities (e.g., unified communication capabilities). In some configurations, the image processing unit 106 may be integrated with or removably coupled to the image source 102, the memory unit 104, the output unit 108, audio devices (e.g., microphones, music players, recorders, speakers, telephones, etc.), video devices (e.g., monitors, projectors, cameras, interactive display units, digital video recorders, etc.), or other types of hardware, in combinations thereof. In some configurations, the image processing unit 106 may represent or include a multi-functional device such as the multi-function device 101, and/or components or functionalities thereof. In some configurations, the image processing unit 106 may comprise or implement one or more real-time protocols (e.g., session initiation protocol (SIP), H.261, H.263, H.264, H.323, etc.) and non-real-time protocols known in the art, related art, or developed later to facilitate data transfer (e.g., electronic images and related data or metadata) to or from network devices including the image source 102, the memory unit 104, and the output unit 108.

Continuing to refer to FIG. 1B, in some configurations, the image processing unit 106 may be configured to suppress or harmonize a background color in the received electronic image (or input image) based on elevation angles and lightness values for pixels in a portion (e.g., corner) of the electronic image to generate a background-suppressed electronic image. In some configurations, the image processing unit 106 includes a color analysis module 120, a background color suppression (BCS) module 122, and a processing unit 124. In some configurations, the color analysis module 120 (or a processor) receives or fetches the input image and associated data from the memory unit 104; In some configurations, the color analysis module 120 may include receiving the input image directly from the image source 102 such as an optical scanner. In some configurations, the color analysis module 120 (or a processor) may be configured to (i) determine a color space of the input image, (ii) convert the input image into a processing color space such as L*a*b* color space (also referred to as CIELAB color space) for generating a LAB image, and (iii) transmit the generated LAB image to the module 122 and/or the memory unit 104.

Continuing to refer to FIG. 1B, the input image may be analyzed by the color analysis module 120 to determine the color space. In some configurations, the color analysis module 120 analyzes pixel values of the input image to determine its color space. If the input image contains a single color channel (i.e., single value per pixel) with pixel values ranging from 0 to 255, the color analysis module 120 may conclude that the input image is received in grayscale or black and white (BW) color space (also referred to as monochrome color space). The input image may include three color channels with pixel values ranging from 0 to 255 (also referred to as RGB range). Based on the input image having three values per pixel (typically representing Red, Green, and Blue) and the related pixel values, the color analysis module 120 may conclude that the input image is encoded in the RGB color space.

In some configurations, the color analysis module 120 may be configured to convert the input image into a color space such as the CIELAB color space based on a color space of the input image. The CIELAB color space includes perceivable colors, and colors within the CIELAB color space are defined independent of their nature of creation or the device used for display. The CIELAB color space may represent a quantitative relationship of colors on three orthogonal axes, namely, L*, a*, and b* axes. In the CIELAB color space, 'L' indicates lightness or brightness, and 'a' and 'b' are chromaticity coordinates. Further, in the CIELAB color space, L* axis may extend on a vertical axis with values from 0 (indicating black) to 100 (indicating white). The a* axis may extend on a horizontal axis with values indicating red-green component of a color, where +a* (positive) and −a* (negative) may indicate red and green values, respectively. The yellow and blue values may be represented on the b* axis with +b* (positive) and −b* (negative) values, respectively. Both a* and b* values range from negative (−) 127 to positive 128. The center of the CIELAB color space, where the three axes, i.e., L*, a*, and b*, intersect with each other, may represent neutral or achromatic character of a pixel. The distance from the center may represent the chroma or saturation of a color. Colors closer to the center may have lower chroma and appear more neutral, while colors towards an outer edge of the CIELAB color space (or away from the center) may have higher chroma and appear more vivid. An angle on the chromaticity axes (i.e., a* or b*) may represent the hue (hereinafter referred to as hue angle) of a color on a two-dimensional (2D) color plane formed by the a and b* axes. The hue angle may indicate a direction of color shift on the 2D color plane, and can range from 0-360°.

Continuing to refer to FIG. 1B, the color analysis module 120 may convert the input image to the CIELAB color space. For example, the input image in RGB color space (hereinafter referred to as RGB image) is received by the color analysis module 120 from the memory unit 104. In the RGB image, the pixel may have three values representing red, green, and blue color channels. For pixels in the RGB image, the color analysis module 120 may normalize the RGB values and apply a gamma correction function to linearize the RGB values. The correction function may create a linear relationship between the RGB values and the perceived brightness. The color analysis module 120 may use a transformation matrix to convert the linearized RGB values to an intermediate XYZ color space and normalize the corresponding X, Y, Z values. The color analysis module 120 may apply a transformation matrix to transform the normalized X, Y, Z values into L, a, b values respectively, in the CIELAB color space. Fr the pixels in the RGB image, the color analysis module 120 may generate the L, a, b values (i.e., LAB data) representing a LAB image. The color analysis module 120 forwards the LAB data/image to the module 122 or stores the data/image in the memory unit 104.

Continuing to refer to FIG. 1B, the color analysis module 120 may generate a LAB image and related LAB data corresponding to a received electronic image in grayscale or monochrome color space. In some configurations, the color analysis module 120 may transmit the input image from the image source 102 (or the memory unit 104) to the module 122 without conversion when the input image may be in the CIELAB color space. In some configurations, the color analysis module 120 may be configured to assist in converting communications (e.g., instructions, queries, data, etc.) from the one or more connected devices (such as the memory unit 104 and the output unit 108) into formats that achieve compatibility with the module 122, or vice versa.

Continuing to refer to FIG. 1B, the module 122 receives the LAB image and related LAB data from the color analysis module 120. In some configurations, the module 122 may fetch the LAB data for the pixels in the LAB image from the memory unit 104. In some configurations, the module 122 is configured to (i) detect a background region in the LAB image based on an elevation angle of a color in the pixels of the LAB image, (ii) calculate elevation angles and lightness values for the pixels of the LAB image and/or in a portion (e.g., tile region) of the LAB image, where the portion may represent the background region, (iii) compute respective histograms for the calculated elevation angles and the lightness values for pixels in the portion, (iv) determine threshold values for the elevation angles and the lightness values based on the computed histograms, (v) suppress or harmonize the color of pixels in the background region based on the threshold values to generate updated L* a* b* values (or updated LAB data) representing a background-suppressed LAB image, and (vi) forward the updated LAB data to the processing unit 124 or store the updated LAB data in the memory unit 104. The background region in the LAB image may correspond to a background in the input image.

The module 122 may be implemented by way of a device (e.g., a computing device, a processor or an electronic storage device) or a combination of multiple devices that are operatively connected or networked together in the same location or different locations. In some configurations, the module 122 may be a hardware device including processor(s) executing machine-readable program instructions for analyzing data, and interactions between the module 122 (or the color analysis module 120) and the output unit 108. The "hardware" may comprise a combination of discrete components, an integrated circuit, an application-specific integrated circuit (ASIC), a field programmable gate array (FPGA), a digital signal processor, or other suitable hardware. The "software" may comprise one or more objects, agents, threads, lines of code, subroutines, separate software applications, two or more lines of code or other suitable software structures operating in one or more software applications or on one or more processor(s). The processor(s) (not shown) may include, for example, microprocessors, microcomputers, microcontrollers, digital signal processors, central processing units, state machines, logic circuits, and/or any devices that can manipulate signals based on operational instructions. Among other capabilities, the processor(s) may be configured to fetch and execute computer readable instructions in a dedicated or shared memory associated with the module 122 for performing tasks such as signal coding, data processing input/output processing, power control, and/or other functions.

In some configurations, the module 122 can be integrated or operating in communication with a mobile switching center, network gateway system, Internet access node, application server, IMS core, service node, or some other communication systems, including any combinations thereof. In some configurations, the module 122 may be integrated with or implemented as a wearable device including, but not limited to, a fashion accessory (e.g., wrist band, ring, lanyard, watch, etc.), a utility device (e.g., access card, mobile robot, beacon, sensor device, etc.), a body clothing, or any combinations thereof. In some configurations, the module 122 may be preconfigured or dynamically configured to perform functions of any of the color analysis module 120, the processing unit 124, the image source 102, the memory unit 104, and the output unit 108. In some configurations, the module 122 may be preconfigured or dynamically configured to control the color analysis module 120 and the processing unit 124 either individually or in tandem with each other, in addition to the memory unit 104 and the output unit 108, via a server (not shown) over the network. The server may be installed, integrated, or operatively associated with the module 122.

In some configurations, the module 122 can be installed on or integrated with any network appliance (not shown) configured to establish the network, e.g., between the module 122 and other devices such as the memory unit 104 and the output unit 108. At least one of the module 122 and the network appliance may be capable of providing an interface to assist in exchange of software instructions and data between the memory unit 104, various modules of the image processing unit 106, and the output unit 108. In further examples, the network appliance may be preconfigured or dynamically configured to include the module 122 integrated with other devices. For example, the module 122 may be integrated with the image source 102 or other device (not shown) connected to the network. The image source 102 may include a module (not shown), which may enable the module 122 for being introduced to the network appliance, thereby enabling the network appliance to invoke the module 122 as a service. Examples of the network appliance may include, but are not limited to, a modem, a wireless access point, a router, a base station, and a gateway.

Figure 2:
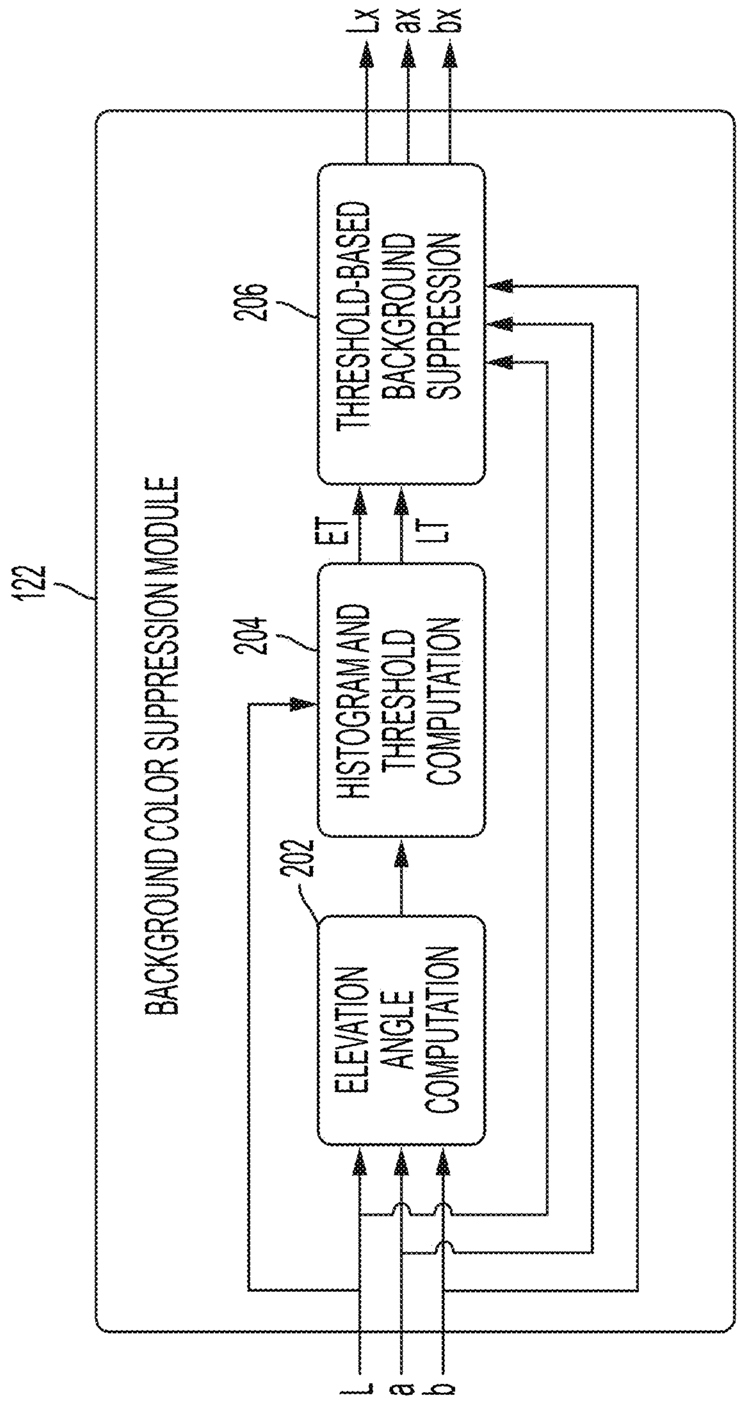
FIG. 2 is a flow diagram of a method in accordance with embodiments of the present disclosure.

Referring now to FIG. 2, in some configurations, the module 122 is configured to detect a background region in the received LAB image, which may be related to the input image as discussed herein. The module 122 receives or fetches the LAB data of the LAB image. The LAB data may include three values per pixel, i.e., L, a, and b values for pixels in the LAB image. The module 122 uses the LAB data to compute 202 an elevation angle θ for the pixels in the LAB image. The elevation angle θ may be calculated using Equation 1.

$$\text{Elevation Angle, } \theta = \tan^{-1}\left(\frac{L - L_0}{\text{Chroma}}\right) \quad (1)$$

where:

$$\text{Chroma} = \sqrt{(a - a_0)^2 + (b - b_0)^2}$$

Figure 3:
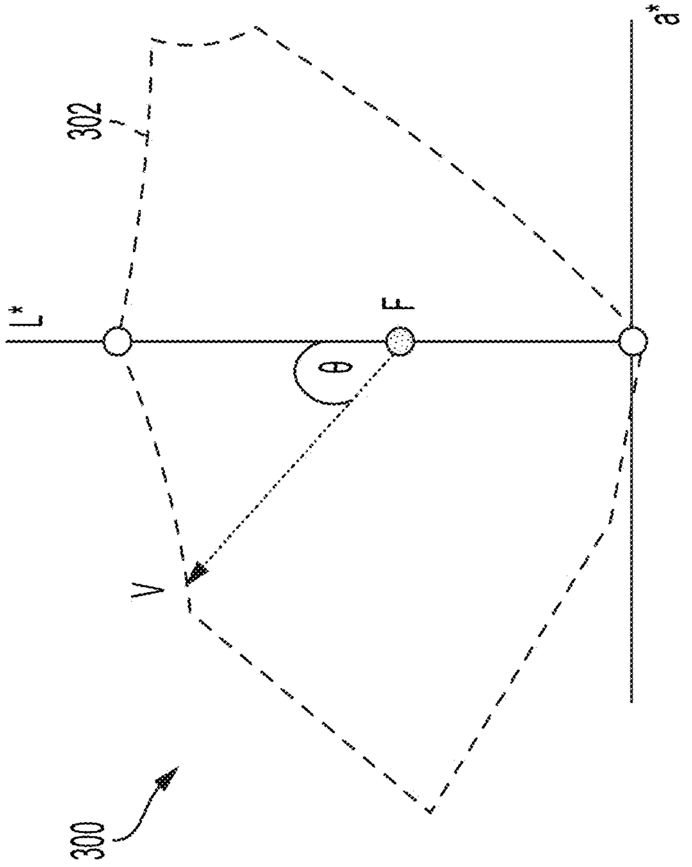
FIG. 3 is a two-dimensional (2D) representation of an elevation angle for an electronic image in the L*a*b* color space, in accordance with embodiments of the present disclosure.

L, a, b=values of a pixel color in the CIELAB color space $L_0$, $a_0$, $b_0$=values of a focal point on the L* axis in the CIELAB color space Referring now to FIG. 3, in some configurations, the module 122 uses the L*a*b* color gamut of standardized RGB (sRGB) color space to define the elevation angle θ for the pixels in the LAB image. The dashed line 302 signifies the sRGB gamut represented in the CIELAB color space. The elevation angle θ refers to an angle between the L* axis and a color vector $\overrightarrow{FV}$ to a pixel color V on the sRGB gamut in the CIELAB color space, where the color vector $\overrightarrow{FV}$ may originate from a focal point on the L* axis. The elevation angle represents both hue and chroma of a color in the pixel. In some configurations, the module 122 may be configured with the focal point F as a midpoint of the L* axis. Since the L values range from 0 (black) to 100 (white) on the L* axis in the CIELAB color space, the midpoint of the L* axis, or the focal point F, may have coordinates as (L=50, a=0, b=0). In some configurations, the module 122 may be configured to set the focal point F away from the midpoint of the L* axis based on (i) an extent of pixel lightness (i.e., number of L values away from the midpoint) and (ii) more than one background color being present in the portion of the input image (e.g., RGB image) corresponding to the received LAB image. In one example, the module 122 may be configured to set the focal point F closer to 0 (black) on the L* axis, e.g., for the focal point F to have the coordinates (L=25, a=0, b=0). In another example, the module 122 may be configured to set the focal point F closer to 100 (white) on the L* axis, e.g., for the focal point F to have the coordinates (L=75, a=0, b=0). The module 122 accumulates the calculated elevation angles (EA) for pixels of the LAB image to create a first dataset. The module 122 creates a second dataset containing L values (or lightness values) of pixels in the LAB image. The first dataset and the second dataset (hereinafter collectively referred to as LAB datasets) may be stored in the memory unit 104 by the module 122.

In some configurations, the module 122 is configured to select a tile region of the LAB image. The tile region may correspond to a portion of the background region in the LAB image (and the corresponding input image). The tile region may be selected using a kernel. The kernel may refer to a matrix of cells configured to assist in selecting or defining a region of interest in an electronic image, such as the input image and the LAB image. The size of the matrix of cells, or kernel size, may be configured to control the tile region to be selected. In some configurations, the size of the matrix of cells can be configured based on any of a variety of factors. Examples of these factors may include, but are not limited to, paper type, paper size, size of one or more LAB datasets, and a number of pixels to be determined in the LAB image/input image. For example, the module 122 may implement a square-shaped kernel as a 256×256 matrix, hereinafter also referred to as 256×256 kernel, comprising 256 rows and 256 columns for determining the tile region in the LAB image. The rows represent a memory space that is 32-bit wide in the memory unit 104. The cells (e.g., A, B, C, . . . and so on) may be 32-bit wide words that may be shifted on pixel-by-pixel basis in the LAB image to obtain specific locations. In some configurations, the module 122 may implement a rectangular-shaped kernel as a 256×128 matrix, hereinafter also referred to as 256×128 kernel, comprising 256 rows and 128 columns for determining or selecting the tile region in the LAB image.

In further examples, the module 122 may be configured to change the kernel orientation based on an orientation of the LAB image or a portion thereof. For example, the module 122 may transpose the 256×128 kernel which may be a portrait orientation into a 128×256 kernel having 128 rows and 256 columns for the LAB image in a landscape orientation. In some configurations, the module 122 may be operable to configure the kernel into various suitable sizes such as 128×64 matrix (i.e., having 128 rows and 64 columns), 64×128 matrix (i.e., having 64 rows and 128 columns), 128×128 matrix (i.e., having 128 rows and 128 columns), and 64×64 matrix (i.e., having 64 rows and 64 columns) being implemented by the module 122. In some configurations, the kernel may be implemented to have (i) a size (e.g., in terms of the number of cells/pixels, data size, etc.) is smaller than that of the input image or the corresponding LAB image, and (ii) the number of rows being less than or equal to the number of columns.

In some configurations, the module 122 may apply the kernel to select the tile region that includes at least one of the corners of the LAB image. In some configurations, the module 122 may apply the 256×256 kernel to successively select four tile regions, each having a size of 256×256 pixels. The tile region may include, for example, one of the four corners of the LAB image. In some configurations, the module 122 is configured to apply the kernel proximate to or along one or more edges of the LAB image to select the near-edge tile region therefrom. In some configurations, the near-edge tile region may be located within a pixel distance from a corner of the LAB image. The pixel distance may be equal to at least half of R up to (PL-R), where R may correspond to a total number of cells in a longest row (or a longest column) of the kernel and PL may correspond to a length of an edge of the input image or the corresponding LAB image. The near-edge tile region may be located according to the pixel distance from a corner or edge of the LAB image. In some configurations, the module 122 may apply the kernel to select at least one tile region including an edge of the LAB image.

The module 122 obtains the elevation angles of pixels in the selected tile regions, e.g., including the corners of the LAB image. In some configurations, the module 122 obtains the elevation angles of pixels in the selected tile regions from the previously accumulated elevation angles of pixels of the LAB image. In some configurations, the module 122 computes elevation angles of pixels in the selected tile regions, e.g., including the four corners, of the LAB image using Eq. (1). The module 122 accumulates the elevation angles of pixels in the selected tile regions to create a third dataset. The module 122 creates a fourth dataset containing L values (or lightness values) of pixels in the selected tile regions of the LAB image. The L values for the pixels of the selected tile regions may be determined by the module 122 from the LAB data from the color analysis module 120 and/or stored in the memory unit 104. The third dataset and the fourth dataset (hereinafter collectively referred to as tile datasets) may be stored in the memory unit 104.

Figure 4:
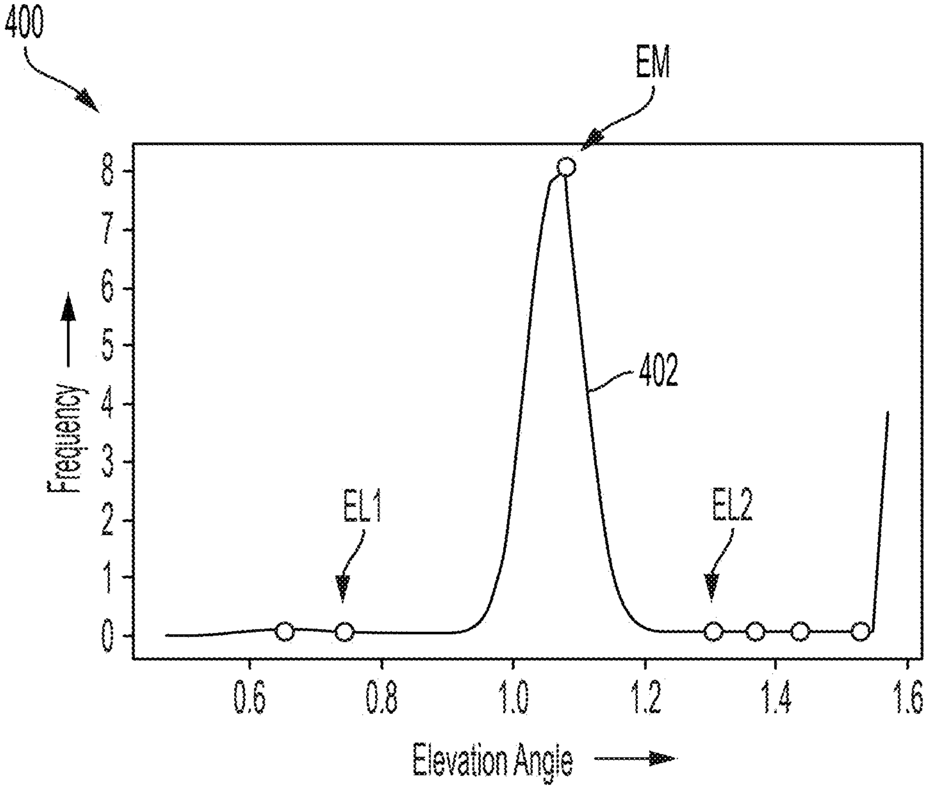
FIG. 4 is a histogram for elevation angles for pixels in a selected region of an electronic image, in accordance with embodiments of the present disclosure.

Referring now to FIG. 4, the module 122 computes 204 (FIG. 2) a first histogram 400 for the elevation angles determined for the selected tile regions. The module 122 computes the first histogram 400 using the third dataset. For example, the first histogram 400, represented as a graph, shows the elevation angles (in radians) determined for the selected tile regions along the x-axis and a frequency of occurrence of those elevation angles along the y-axis. The frequency of occurrence indicates a number of pixels (in the selected tile regions) having substantially the same elevation angle. The first histogram 400 includes a curve 402 that indicates a distribution of both hue and chroma of colors in the selected tile regions based on the corresponding elevation angles marked on the x-axis. The curve 402 has local peaks indicated by dots, where the local peaks may indicate the presence of different colors, indicated by the corresponding elevation angles, in the selected tile regions. The maximum peak EM of the curve 402 corresponds to a dominant elevation angle (occurring for the tile pixels) indicating a dominant color in the selected tile regions of the LAB image.

Continuing to refer to FIG. 4, in some configurations, the module 122 determines a first threshold value (ET) for elevation angles in the first dataset associated with the LAB image based on the first histogram 400. The module 122 is configured to determine a lowest local peak immediately next to the maximum peak in the first histogram 400. For example, the module 122 determines local peaks EL1 and EL2 being present immediately next to the maximum peak EM in the first histogram 400. Out of the two closest local peaks EL1 and EL2, the module 122 may select the lowest local peak such as the local peak EL1. The selected lowest local peak EL1 may correspond to a lowest elevation angle, which may represent both hue and chroma of a background color present in the least number of pixels in the selected tile regions. The proximity or closeness of the lowest local peak EL1 to the maximum peak EM may signify the presence of a background color whose hue and chroma may be related to the dominant color indicated by the maximum peak EM. In the first histogram, the lowest local peak EL1 may assist in selecting a color that may be the least saturated shade of the dominant color present in the background region of the LAB image. The selected lowest local peak EL1 may allow the module 122 to target the least saturated shade of the dominant background color without affecting other non-background colors in the LAB image. The module 122 may set the first threshold value (ET) as the elevation angle corresponding to the selected lowest peak EL1 in the first histogram.

Figure 5:
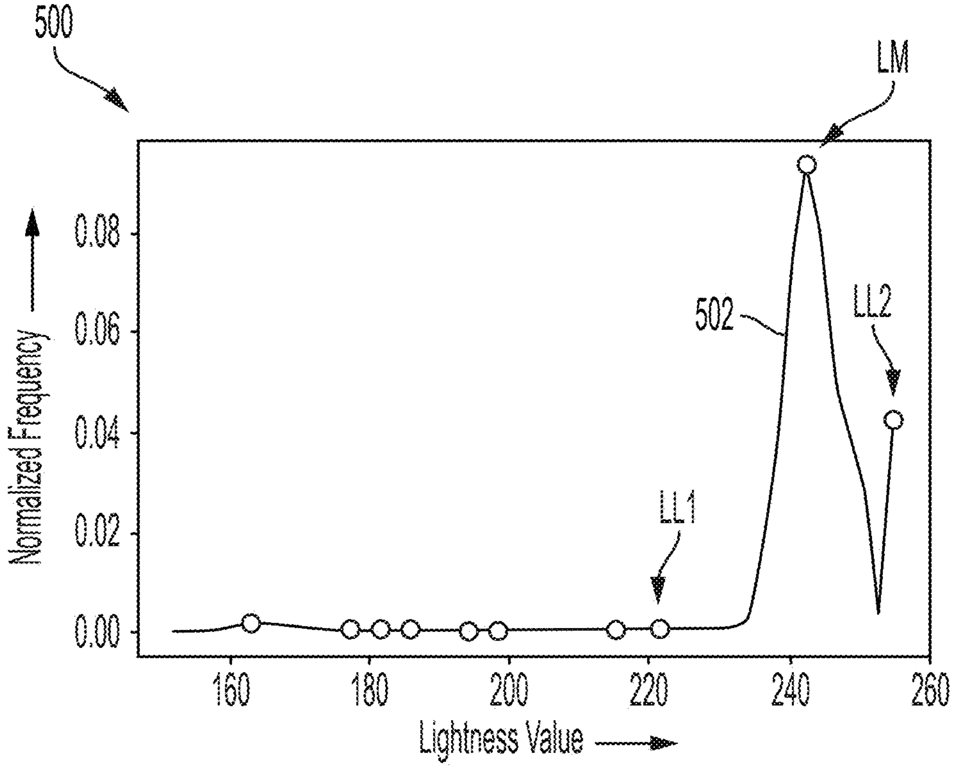
FIG. 5 is a histogram for lightness values for pixels in the selected region of FIG. 4, in accordance with embodiments of the present disclosure.

Referring now to FIG. 5, the module 122 computes a second histogram 500 for the lightness values for the selected tile regions. The module 122 is configured to compute the second histogram 500 using the fourth dataset. For example, the second histogram 500, represented as a graph, shows the lightness values determined for the selected tile regions along the x-axis and a normalized frequency of occurrence of those lightness values along the y-axis. The normalized frequency of occurrence may indicate a number of pixels (in the selected tile regions) having substantially the same lightness values. The second histogram 500 includes a curve 502 indicating a distribution of lightness values (or L values) in the selected tile regions. The curve 502 has local peaks indicated by dots, where the local peaks may indicate the presence of pixels having different lightness in the selected tile regions. The maximum peak, such as the maximum peak LM, of the curve 502 may correspond to a dominant lightness value (occurring for the tile pixels) indicating the dominant lightness value of a color in the selected tile regions of the LAB image.

Continuing to refer to FIG. 5, the module 122 may determine a second threshold value (LT) for the lightness values in the second dataset associated with the LAB image based on the second histogram 500. In some configurations, the module 122 is configured to determine a lowest local peak immediately next to the maximum peak in the second histogram 500. For example, the module 122 may determine local peaks LL1 and LL2 immediately next to the maximum local peak LM in the second histogram 500. Out of the two closest local peaks LL1 and LL2, the module 122 may select the lowest local peak such as the local peak LL1. This selected lowest peak LL1 may correspond to a lowest lightness value (e.g., of a background color) present in the least number of pixels in the selected tile regions. The proximity or closeness of the lowest local peak LL1 to the maximum peak LM may signify the presence of a lightness value related to the dominant lightness value indicated by the maximum peak LM. In the second histogram, the lowest local peak LL1 may assist in selecting a lightness value that may be less than the dominant lightness value present in the background region of the LAB image. The selected local peak LL1 further allows the module 122 to target the lowest lightness value for correction in the background region without affecting other lightness values in non-background regions of the LAB image, thereby assisting in retaining neutral shades. The module 122 may then set the second threshold value (LT) as the lightness value corresponding to the selected lowest local peak LL1 in the second histogram. The first threshold value (ET) and the second threshold value (LT) (hereinafter collectively referred to as threshold values) may be stored in the memory unit 104.

Referring again to FIG. 2, the module 122 is configured to suppress 206 a background color in the LAB image based on the determined threshold values. The module 122 accesses the stored LAB data corresponding to the received LAB image, the LAB datasets, and the threshold values. In some configurations, for the pixels in the LAB image, the module 122 compares the corresponding lightness value (from the second dataset) with the second threshold value (LT). The module 122 compares the elevation angle calculated for the pixels in the LAB image (from the first dataset) with the first threshold value (ET). If the lightness value (from the second dataset) is greater than the second threshold value (LT) and the elevation angle (from the first dataset) is greater than the first threshold value (ET) for a pixel in the LAB image, the module 122 sets the pixel value to white in the CIELAB color space, i.e., changes the pixel value to (L=100, a=0, b=0) in the CIELAB color space. The module 122 may operate to make no change in pixel values of the LAB image if the corresponding lightness value and/or elevation angle is less than the corresponding threshold values LT and ET respectively. By changing the pixel value to white, the module 122 assists in suppressing color(s) in the background of the LAB image. Based on changes in the pixel values, the module 122 generates an updated set of pixel values (Lx, ax, bx,), or the updated LAB data, representing the background-suppressed LAB image. The module 122 may forward the updated LAB data to the processing unit 124. In some configurations, the module 122 may include storing the updated LAB data in the memory unit 104.

Referring again to FIG. 1B, the processing unit 124 (or a processor) receives the updated LAB data from the module 122. In some configurations, the processing unit 124 may fetch the LAB data for the pixels in the LAB image from the memory unit 104. In some configurations, the processing unit 124 (or a processor) is configured to convert the updated LAB image (and the corresponding updated LAB data) into a color space. For example, the processing unit 124 may convert the updated LAB image (and the corresponding updated LAB data) into an output image in the CMYK color space, e.g., for printing the output image on a print medium such as a paper. In another example, the processing unit 124 may convert the updated LAB image (and the corresponding updated LAB data) into an output image in the RGB color space, e.g., for displaying the output image on a display device. The output image may lack the background color of the original input electronic image received by the image processing unit 106 (or the module 122). The processing unit 124 may send the output image and related image data to the output unit 108. In some configurations, the processing unit 124 may send the updated LAB image and/or the output image (including related image data) to a remote device such as the memory unit 104 over the network.

Continuing to refer to FIG. 1B, the output unit 108 may operate in communication with the image processing unit 106 via the processing unit 124 over a wired or wireless connection. The output unit 108 may receive the output image and related data from the processing unit 124/. In some configurations, the output unit 108 fetches the output image and related data from the memory unit 104. Examples of the output unit 108 include a display device such as a touchscreen display, handling device (such as a print head controller and a marking engine), a storage medium, a computing device, and a printer. In some configurations, the output unit 108 may include a multi-functional device 101, and/or components or functionalities thereof. In some configurations, the output unit 108 is configured to receive, store, process, display, email, or print electronic images such as the output image and the input image. For example, the output unit 108 may operate as a multi-function device including one or more print or marking engines configured to print the output image, i.e., the background-suppressed electronic image received from the image processing unit 106 or modules thereof. The marking engine may be configured to implement printing technologies including, but not limited to, xerographic, ink-jet (bubble jet), laser, offset, solid-ink, and dye sublimation.

Figure 6A:
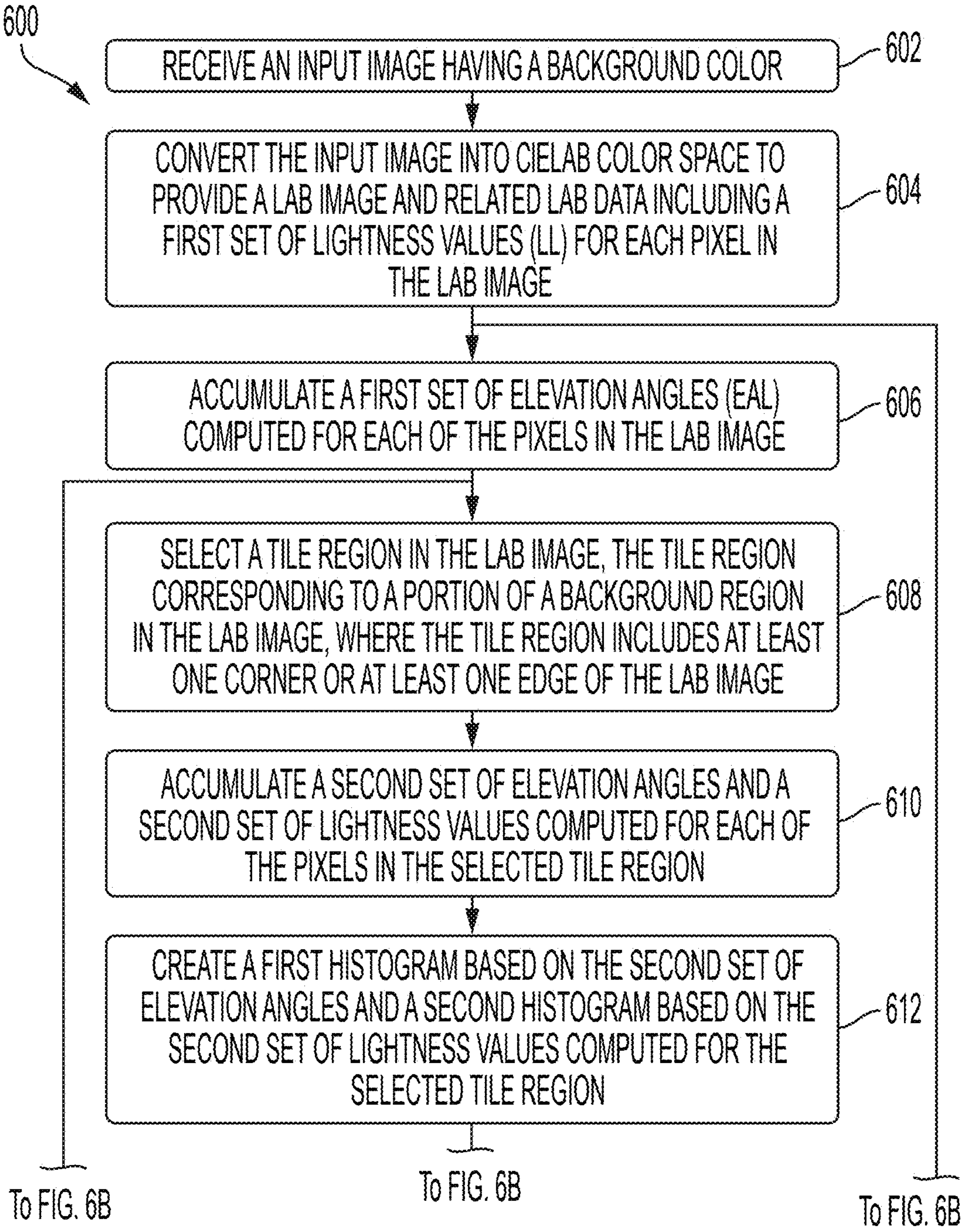
FIGS. 6A-6C are flowcharts of a method for background color suppression in the electronic image, in accordance with embodiments of the present disclosure.
Figure 6B:
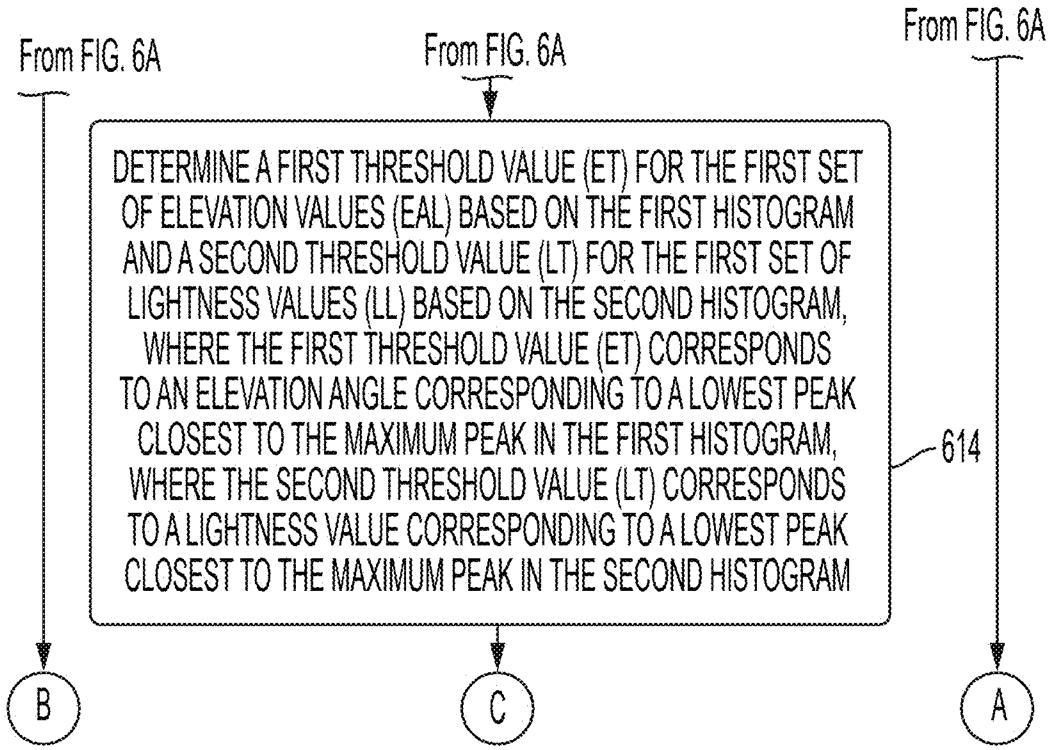
Figure 6C:
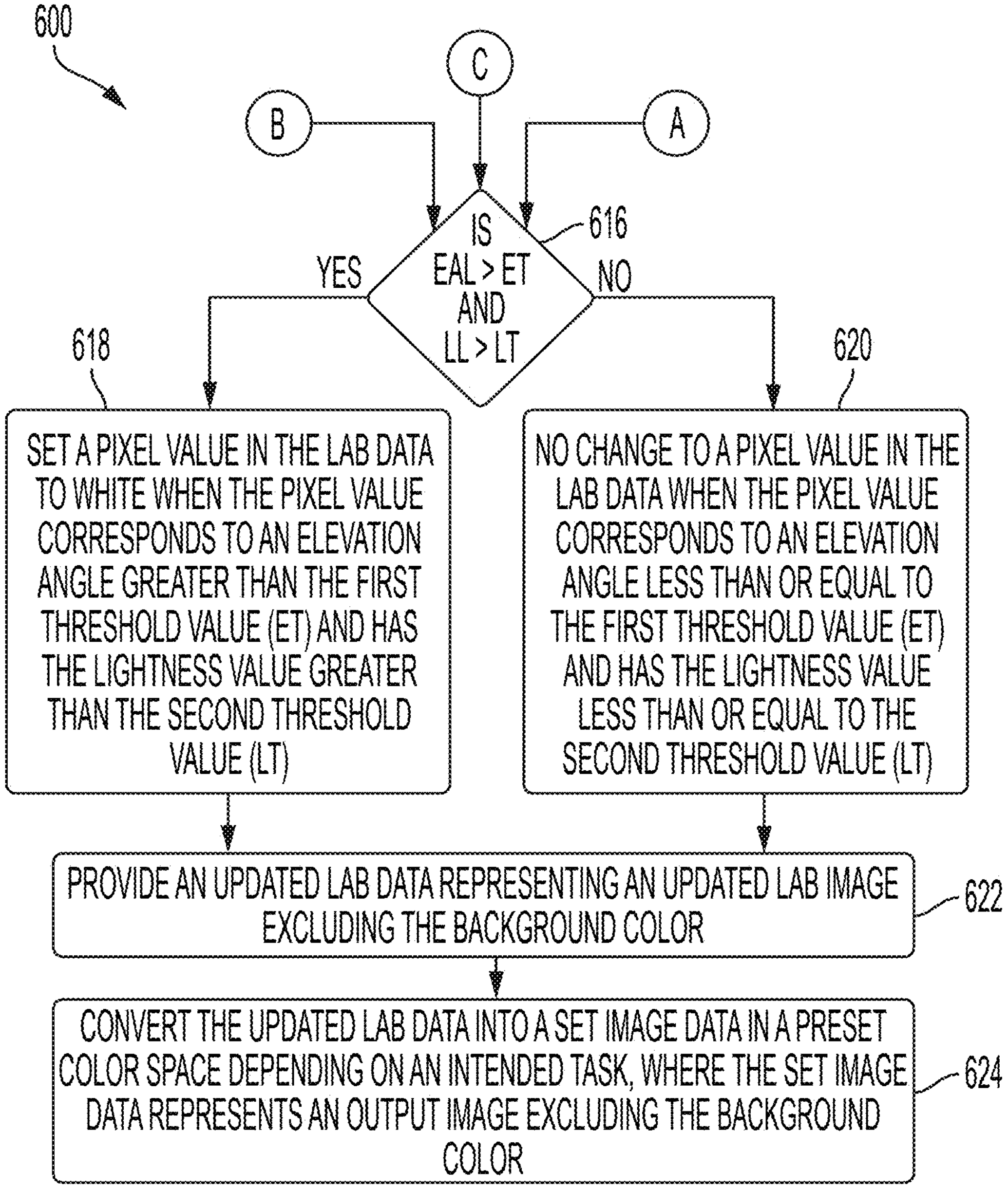

Referring now to FIGS. 6A-6C, the method 600 includes operations of the image processing unit 106. The order in which the method 600 is described is not intended to be construed as a limitation, and the described method blocks may be combined or otherwise performed to implement the method 600, or an alternate method. Individual blocks may be deleted from the method 600 without departing from the concepts described herein. The method 600 may be implemented in any hardware, software, firmware, or combination thereof.

Figure 7:
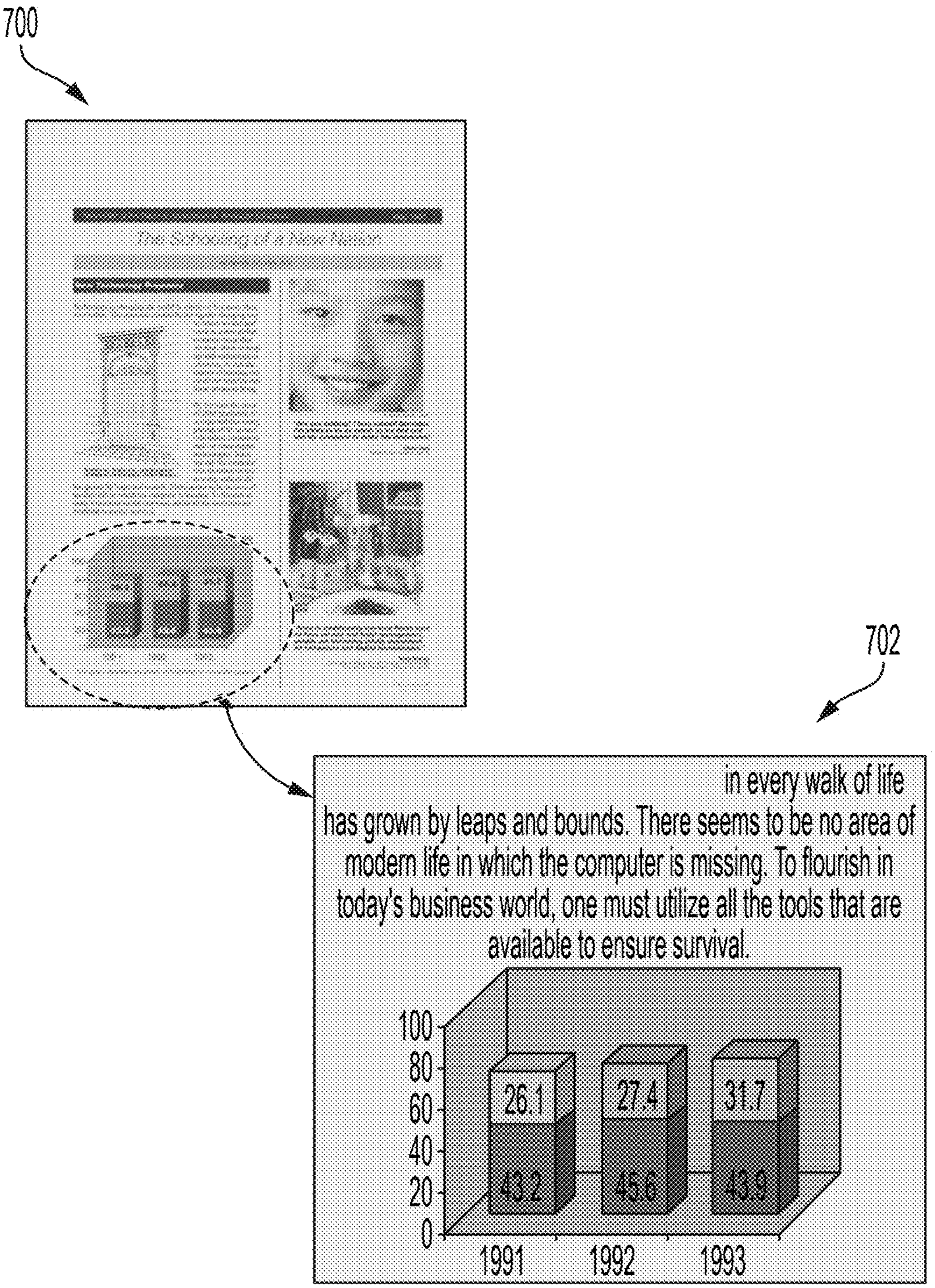
FIG. 7 is an electronic image including a colored background and a representative portion thereof for input to a system executing in accordance with embodiments of the present disclosure.

Referring now to FIG. 6A, at 602, an electronic image having a background color is received. In some configurations, the image processing unit 106 may receive an input electronic image from the image source 102 or a storage device such as the memory unit 104. The image source 102 such as an optical scanner may scan a physical document to generate the input image and related image data. The input image may be generated in a color space such as grayscale, RGB, and CMYK. In one example, the physical document may be colorized, i.e., have a color in the background. For instance, as illustrated in FIG. 7, the physical document is colorized to have a yellow color in the background. The image source 102 may scan the colorized physical document to generate an input image 700 in the RGB color space (hereinafter also referred to as RGB image 700). The RGB image 700 has a colorized background such as a yellow color. The image source 102 may send the generated RGB image 700 to the image processing unit 106 for processing and/or may store in the memory unit 104.

Continuing to refer to FIG. 6A, at 604, the input image is converted to CIELAB color space. In some configurations, the input image is received by the color analysis module 120 (or a processor) in the image processing unit 106. The color analysis module 120 (or a processor) is configured to convert the input image such as the RGB image 700 to CIELAB color space for providing a LAB image and related LAB data. The LAB data includes L, a, b values for the pixels in the RGB image 700. The LAB data include a first set of lightness values (or L values) pertaining to pixels in the RGB image 700. The color analysis module 120 sends the LAB image and the related LAB data to the module 122 for processing. In some configurations, the LAB image and the related LAB data may be stored in the memory unit 104. In some configurations, the module 122 is configured to perform the functions of the color analysis module 120.

Continuing to refer to FIG. 6A, at 606, a first set of elevation angles computed for the pixels in the LAB image is accumulated. In some configurations, the module 122 receives the LAB image (in CIELAB color space) along with the related LAB data from the color analysis module 120. In some configurations, the module 122 may fetch the LAB data from the memory unit 104. The module 122 is preconfigured or dynamically configured to compute an elevation angle for the pixels in the LAB image using Eq. (1). The elevation angle operates as a single variable that represents both the hue and chroma of a pixel color. The module 122 accumulates a first set of elevation angles computed for pixels in the LAB image.

Continuing to refer to FIG. 6A, at 608, a tile region is selected in the LAB image. In some configurations, the module 122 is configured to select at least one tile region in the LAB image. The tile region may correspond to a portion of a background region in the LAB image (and the corresponding RGB image 700). The module 122 may select the tile region based on a kernel (not shown) having a size. The kernel may refer to a matrix of cells configured to assist in selecting or defining a region of interest in the LAB image. For example, the module 122 may be configured to use a square-shaped 256×256 kernel having 256 rows and 256 columns to select one or more tile regions. In some configurations, the module 122 may apply a rectangular kernel, e.g., 256×128 kernel having 256 rows and 128 columns to select one or more tile regions. In some examples, the module 122 may change or set an orientation of the kernel based on an orientation of the LAB image or a portion thereof. The module 122 may apply the kernel to select the tile region including at least one area, e.g., corner pixels, in the LAB image. In some configurations, the module 122 may apply the kernel to select the tile region including at least one of the areas or portions thereof (e.g., edge pixels) in the LAB image. The selected tile region may include a combination of areas, such as, for example, at least one corner and an edge portion in the LAB image (and the corresponding input image).

Continuing to refer to FIG. 6A, at 610, a second set of elevation angles computed for the pixels in the selected tile region is accumulated. In some configurations, the module 122 is configured to obtain the elevation angles for the pixels in the selected tile region from the elevation angles of the pixels of the LAB image. In some configurations, the module 122 is configured to compute an elevation angle for the pixels in the selected tile regions of the LAB image using Eq. (1). The module 122 accumulates a second set of elevation angles computed for pixels in the selected tile regions. The module 122 extracts and accumulates a second set of lightness values computed for pixels in the selected tile regions.

Continuing to refer to FIG. 6A, at 612, histograms are created. In some configurations, the module 122 is configured to create a first histogram 400 (FIG. 4) based on the second set of elevation angles computed for pixels in the selected tile regions. The module 122 creates a second histogram 500 (FIG. 5) based on the second set of lightness values computed for pixels in the selected tile regions. The first histogram and the second histogram (collectively referred to as histograms) include a curve including a plurality of local peaks. For example, the first histogram includes a first curve 402 (FIG. 4) indicating a distribution of elevation angles, which may represent both the hue and chroma of pixel colors, in the selected tile regions. Colors present in the selected tile regions may correspond to a background color in the LAB image and the corresponding RGB image 700 (FIG. 7). In the first histogram 400 (FIG. 4), the local peaks may indicate the presence of different background colors, indicated by the corresponding elevation angles, in the selected tile regions. The second histogram 500 (FIG. 5) includes a second curve 502 (FIG. 5) indicating a distribution of lightness values in the selected tile regions. In the second histogram 500 (FIG. 5), the local peaks may indicate the presence of pixels having different lightness (e.g., shades of gray) in the selected tile regions.

Referring now to FIG. 6B, at 614, threshold values are determined based on the histograms. In some configurations, the module 122 is configured to determine a first threshold value (ET) for the first set of elevation angles (EAL) computed for pixels in the LAB image. The module 122 may determine a peak, such as the local peak EL1 which may be a lowest peak, which may be closest to the maximum peak, e.g., local peak EM, in the first histogram 400 (FIG. 4). This closest lowest peak, such as the local peak EL1, may correspond to a lowest elevation angle, which may represent both hue and chroma of a background color present in the least number of pixels in the selected tile region(s). The proximity or closeness (of the lowest peak) to the maximum peak may indicate the presence of a background color whose hue and chroma may be related to the dominant color indicated by the maximum peak. In some configurations, in the first histogram 400 (FIG. 4), the closest lowest peak may assist in selecting a color that may be the least saturated shade of the dominant color present in the background region of the LAB image corresponding to the RGB image 700 (FIG. 7). In some configurations, the closest lowest peak may further allow to target the least saturated shade of the dominant background color without affecting other colors (e.g., content colors) in the LAB image of the RGB image 700 (FIG. 7). The module 122 may set the first threshold value (ET) as the elevation angle, which corresponds to the closest lowest peak in the first histogram 400 (FIG. 4).

Continuing to refer to FIG. 6B, the module 122 is configured to determine a second threshold value (LT) for the first set of lightness (LL) previously computed for pixels in the LAB image. The module 122 may determine a lowest peak, such as the local peak LL1, which may be closest to the maximum peak, e.g., local peak LM, in the second histogram such as the second histogram 500 (FIG. 5). This closest lowest peak may correspond to a lowest lightness value (e.g., of a background color) present in the least number of pixels in the selected tile region(s). In some configurations, the proximity or closeness (of the lowest peak) to the maximum peak may indicate the presence of a lightness value related to the dominant lightness value indicated by the maximum peak. In some configurations, in the second histogram 500 (FIG. 5), the closest lowest peak may assist in selecting a lightness value that may be less than the dominant lightness value present in the background region of the LAB image corresponding to the RGB image 700 (FIG. 7). In some configurations, the closest lowest peak may further allow the module 122 to target the lowest lightness value in the background region without affecting other lightness values in the LAB image of the RGB image 700 (FIG. 7), thereby assisting to retain neutral shades even in gradient regions. The module 122 may set the second threshold value (LT) as the lightness value, which corresponds to the closest lowest peak in the second histogram.

Referring now to FIG. 6C, at 616, the first set of elevation angles and the first set of lightness values are compared with the respective threshold values. In some configurations, the module 122 performs a comparison between the first set of elevation angles (EAL), which may be computed for the pixels in the LAB image, and the first threshold value (ET). The module 122 performs a comparison between the first set of lightness values (LL), which may be determined for the pixels in the LAB image, and the second threshold value (LT). For the pixels in the LAB image, if the corresponding elevation angle is greater than the first threshold value (ET) as well as the corresponding lightness value is greater than the second threshold value (LT), then the module 122 performs block 618, else the module 122 performs block 620.

Continuing to refer to FIG. 6C, at 618, pixel value in the LAB data is adjusted. The module 122 is configured to set a pixel value in the LAB data to a color such as, for example, but not limited to, white if the elevation angle of the pixel is greater than the first threshold value (ET) and has a lightness value greater than the second threshold value (LT). In some configurations, the color 'white' may pertain to the lightness value (or L value)=100, a=0, and b=0 in the CIELAB color space. Based on the value of white in the CIELAB color space, the module 122 adjusts or changes the pixel value (in the LAB data) to have L=100, a=0, and b=0 in the CIELAB color space. Such adjustment or change in pixel value to white in the LAB data assists in suppressing color in the background region of the corresponding LAB image.

Continuing to refer to FIG. 6C at 620, no change is made to a pixel value in the LAB data. In some configurations, the module 122 may make no change to a pixel value in the LAB data when the pixel value corresponds to an elevation angle less than or equal to the first threshold value (ET) and has the lightness value less than or equal to the second threshold value (LT). No change in pixel values in the LAB data may indicate that the pixel values may be already set to white, thereby implying absence of any hue in the related background region of the corresponding LAB image.

Continuing to refer to FIG. 6C, at 622, updated LAB data representing an updated LAB image. In some configurations, the module 122 may provide updated LAB data after checking or updating the pixel values in the LAB data based on the comparisons. The updated LAB data may represent an updated LAB image that possibly lacks the background color. The module 122 may send the updated LAB data to a processing unit 124 for further processing.

Figure 8:
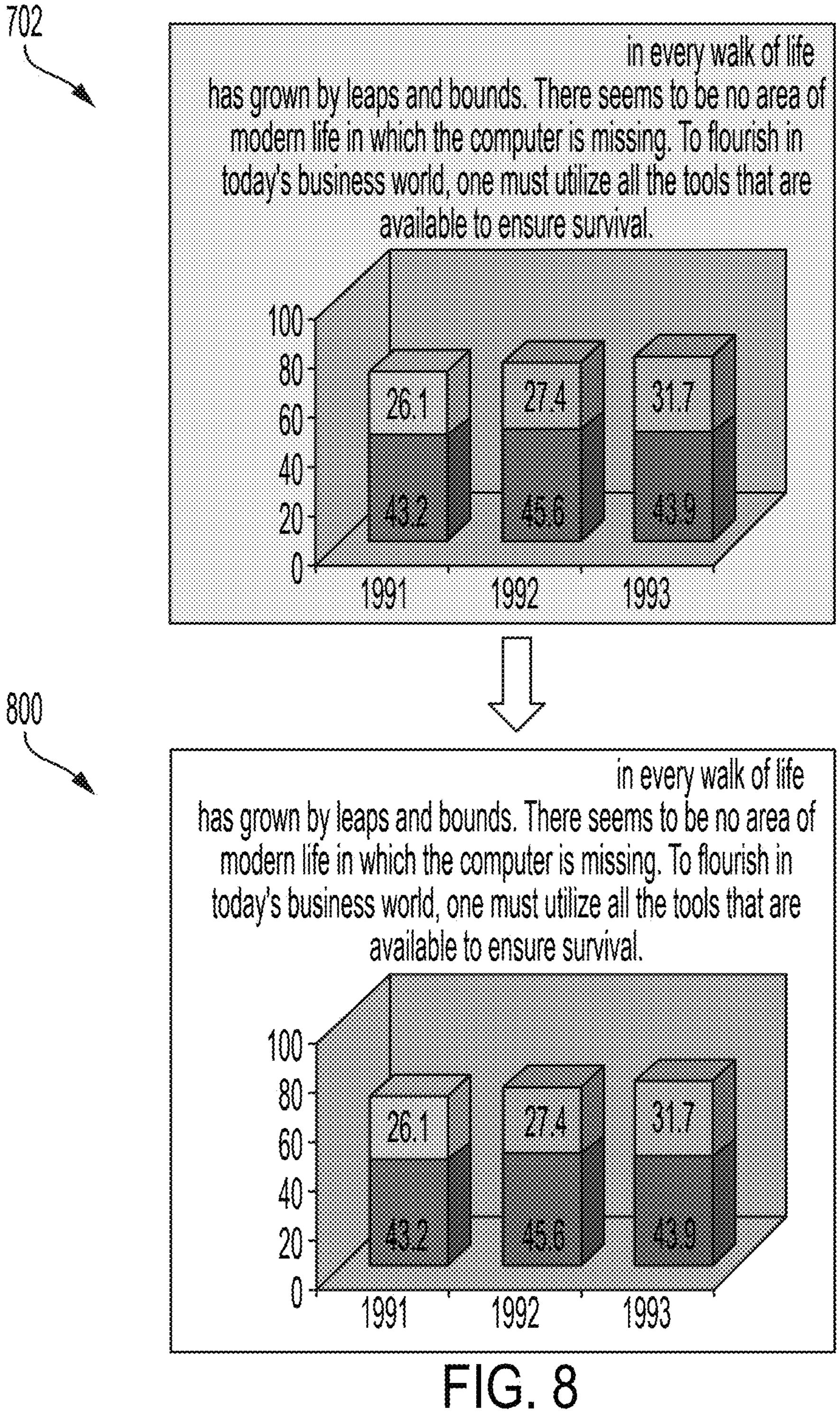
FIG. 8 is the representative portion of FIG. 7 transformed into an output image, in accordance with embodiments of the present disclosure.

Continuing to refer to FIG. 6C, at 624, the updated LAB data is converted into a set image data in a color space. In some configurations, the processing unit 124 receives the updated LAB data from the module 122. In some configurations, the module 122 may be configured to perform the functions of the processing unit 124. The updated LAB data is received in the CIELAB color space. The processing unit 124 converts the updated LAB data into a set image data in a color space, which may be different from the CIELAB color space, depending on, for example, but not limited to, an intended task. For example, as illustrated in FIG. 8, the processing unit 124 may convert the updated LAB data into a set image data in the RGB color space for display on a display device. The set image data may represent an output image such as RGB image 800 (FIG. 8). The output image may lack background color, such as, for example, yellow, which may be present in the input image such as the RGB image 700 (FIG. 7). In some configurations, method 600 may assist in transforming the input image, such as the input RGB image 700 (FIG. 7), and any portion thereof such as portion 702 (FIG. 7) into the RGB image 800 (FIG. 8) in which the background color is suppressed or lacking. In some configurations, the processing unit 124 may convert the updated LAB data into a set image data in the CMYK color space, where the set image data may represent a CMYK image for printing. Other color spaces are contemplated for use.

Numerous references may be made herein regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Unless specifically stated otherwise, as apparent from the discussion herein, it is appreciated that throughout the description, discussions utilizing terms such as “receiving” or “determining” or “identifying” “or accumulating” or “comparing” or “storing” or “selecting” or “setting” or “changing” or “updating” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or other magnetic storage medium, CD-ROM, DVD, or other optical medium, a RAM, a PROM, an EPROM, a FLASH-EPROM, or other memory chip or cartridge, or other tangible medium from which a computer can read and use.

The terminology used herein is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A computer-implemented method for background color suppression in a document, the computer-implemented method comprising:

receiving, using a processor, image data of an input image in a color space, the input image pertaining to the document having a background color, wherein the image data includes lightness values of pixels in the input image;

accumulating, using the processor, elevation angles computed for the pixels in the input image, wherein each of the elevation angles represents hue and chroma of a color of the pixel;

selecting, using the processor, a tile region in the input image, the tile region having a first threshold value for the elevation angles and a second threshold value for the lightness values; and suppressing the background color in the input image by changing a pixel value of the pixel to a pre-selected color when the elevation angle of the pixel is greater than the first threshold value and the lightness value of the pixel is greater than the second threshold value.

2. The method of claim 1, wherein the color space comprises:

a L*a*b* color space, wherein the elevation angle corresponds to an angle between a lightness axis and a color vector originating from a focal point on the lightness axis to a pixel color in the L*a*b* color space.

3. The method of claim 2, wherein the focal point comprises:

a midpoint of the lightness axis in the L*a*b* color space.

4. The method of claim 1, further comprising:

selecting the tile region based on a kernel having a configurable number of rows and columns of cells.

5. The method of claim 4, further comprising:

transposing the kernel when changing an orientation of the input image.

6. The method of claim 1, further comprising:

basing the first threshold value on a first histogram created using the elevation angles computed for the pixels in the selected tile region, wherein the first threshold value comprises the elevation angle corresponding to a lowest local peak closest to a maximum peak in the first histogram.

7. The method of claim 1, further comprising:

basing the second threshold value on a second histogram created using the lightness values for the pixels in the tile region, wherein the second threshold value comprises the lightness value corresponding to a lowest local peak closest to a maximum peak in the second histogram.

8. The method of claim 7, further comprising:

determining the lightness values for the pixels in the selected tile region from the image data.

9. The method of claim 1, further comprising:

receiving the input image from an image source including at least one of a camera, an optical scanner, or a computing device.

10. The method of claim 1, further comprising:

updating, using the processor, the image data to include the changed pixel value, wherein the updated image data includes an updated image;

converting, using the processor, the updated image into a second color space to generate an output image; and performing, using the processor, a task using the output image, wherein the task includes at least one of (i) printing the output image on a print medium, (ii) displaying the output image on a display device, (iii) sending the output image to a remote device, or (iv) storing the output image in a memory device.

11. A system comprising:

a memory unit storing image data of an input image in a color space, wherein the input image pertains to a document having a background color; and a processor in communication with the memory unit, wherein the processor is configured to execute instructions that perform operations including:

receiving the image data including lightness values of pixels in the input image;

accumulating elevation angles computed for the pixels in the input image, wherein each of the elevation angles represents hue and chroma of a color of the pixel;

selecting a tile region in the input image, the tile region having a first threshold value for the elevation angles and a second threshold value for the lightness values; and suppressing the background color in the input image by changing a pixel value of the pixel to a pre-selected color when the elevation angle of the pixel is greater than the first threshold value and the lightness value of the pixel is greater than the second threshold value.

12. The system of claim 11, wherein the color space comprises:

a L*a*b* color space, wherein the elevation angle corresponds to an angle between a lightness axis and a color vector originating from a focal point on the lightness axis to a pixel color in the L*a*b* color space.

13. The system of claim 12, wherein the focal point comprises:

a midpoint of the lightness axis in the L*a*b* color space.

14. The system of claim 11, wherein the operations further comprise:

selecting the tile region based on a kernel having a configurable number of rows and columns of cells.

15. The system of claim 14, wherein the operations further comprise:

transposing the kernel when changing an orientation of the input image.

16. The system of claim 11, wherein the operations further comprise:

determining the first threshold value based on a first histogram created using the elevation angles computed for the pixels in the selected tile region, wherein the first threshold value is the elevation angle corresponding to a lowest local peak closest to a maximum peak in the first histogram.

17. The system of claim 11, wherein the operations further comprise:

determining the second threshold value based on a second histogram created using the lightness values determined for the pixels in the selected tile region, wherein the second threshold value is the lightness value corresponding to a lowest local peak closest to a maximum peak in the second histogram.

18. The system of claim 17, wherein the operations further comprise:

determining the lightness values for the pixels in the selected tile region from the image data.

19. The system of claim 11, wherein the operations further comprise:

receiving the input image from an image source including at least one of a sensor or a computing device.

20. The system of claim 11, wherein the operations further comprise:

updating, using the processor, the image data to include the changed pixel value, wherein the updated image data includes an updated image;

converting, using the processor, the updated image into a second color space to generate an output image; and performing, using the processor, a task using the output image, wherein the task includes at least one of (i) printing the output image on a print medium, (ii) displaying the output image on a display device, (iii) sending the output image to a remote device, or (iv) storing the output image in a memory device.

* * * * *